United States Patent [19]

Strowick et al.

[11] E Patent Number: Re. 32,790

[45] Reissued Date of Patent: Nov. 29, 1988

[54] INERTIALLY LOCKED HINGE FOR MOTOR VEHICLE SEAT

[75] Inventors: Willibald Strowick; Paul Werner, both of Remscheid-Lennep, Fed. Rep. of Germany

[73] Assignee: Keiper Recaro Incorporated, Battle Creek, Mich.

[21] Appl. No.: 817,717

[22] Filed: Jan. 10, 1986

Related U.S. Patent Documents

Reissue of:

[64] Patent No.: Re. 31,741
Issued: Nov. 20, 1984
Appl. No.: 173,803
Filed: Jul. 30, 1980

Which Is a Reissue of:

[64] Patent No.: 4,165,128
Issued: Aug. 21, 1979
Appl. No.: 833,336
Filed: Sep. 14, 1977

[30] Foreign Application Priority Data

Sep. 16, 1976 [DE] Fed. Rep. of Germany ..... 2641587

[51] Int. Cl.[4] ..... A47C 1/025

[52] U.S. Cl. ..... 297/367; 297/216; 297/379

[58] Field of Search ..... 297/216, 366, 367, 378, 297/379

[56] References Cited

U.S. PATENT DOCUMENTS

| | | | |
|---|---|---|---|
| 2,873,794 | 2/1959 | Leslie et al. | 297/379 |
| 3,549,202 | 12/1970 | Boschen et al. | 297/379 |
| 3,628,831 | 12/1971 | Close | 297/379 |
| 3,848,923 | 11/1974 | Dehler | 297/379 |
| 3,900,225 | 8/1975 | Wirtz et al. | 297/367 |
| 3,972,564 | 8/1976 | Arlauskas et al. | 297/379 X |
| 3,973,288 | 8/1976 | Pickles | 297/379 X |
| 3,999,247 | 12/1976 | Cremer | 297/379 |
| 4,318,569 | 3/1982 | Bilenchi et al. | 297/379 |

*Primary Examiner*—Kenneth J. Dorner
*Assistant Examiner*—Peter R. Brown
*Attorney, Agent, or Firm*—Lloyd M. Forster

[57] ABSTRACT

A motor-vehicle seat hinge has an upper hinge element secured to the back part of the seat and a lower hinge element secured to the seat part, a positioning plate securable at any of a plurality of angularly offset positions and coacting with an abutment on the upper element to define the rest position for the seat back. An inertial two-arm pawl is pivoted on the upper hinge element and has on one arm a stop face which is engageable with the positioning plate in a blocking position of this pawl to prevent forward pivoting of the back seat. The other arm of the pawl is weighted so as normally to pivot from the blocking position into a freeing position when the back part is slowly pivoted forwardly but to resist due to its inertia the change of its position when the back part is subject to an abrupt forward movement.

20 Claims, 2 Drawing Sheets

FIG. 1
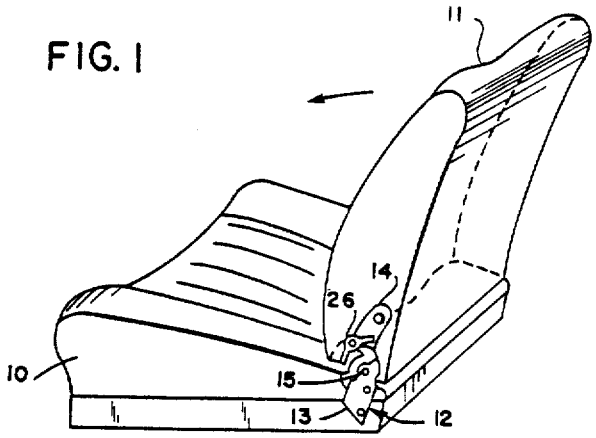
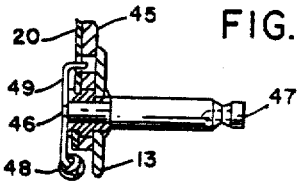
FIG. 5
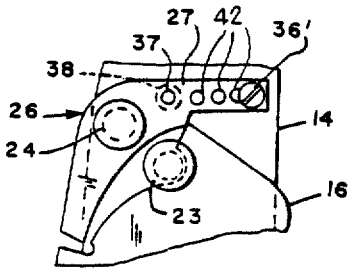
FIG. 6
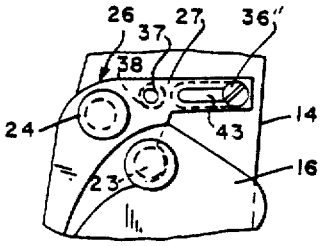
FIG. 7

INERTIALLY LOCKED HINGE FOR MOTOR VEHICLE SEAT

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

*RELATED PATENT*

*This application is for reissue of our U.S. Pat. No. 4,165,128 for Inertially Locked Hinge for Motor-Vehicle Seat issued on Aug. 21, 1979.*

BACKGROUND OF THE INVENTION

The present invention relates to a hinge for interconnecting the back part and seat part of an automotive-vehicle seat.

More particularly this invention concerns such a hinge which permits the back part to pivot forwardly on the seat part yet which allows the back part to be fixed relative to the seat part.

In a two-door motor vehicle it is normally necessary to pivot forward the back part of each front seat in order to enter or have access to the back part thereof. To this end hinges are provided between the seat part and back part. In order to adjust the front seats these hinges are normally provided with a mechanism that allows the rest position of the back part of the motor-vehicle seat to be adjusted. Furthermore, federal regulations now require that the back part be non-pivotal relative to the seat part under normal conditions so that in the event of a frontal collision the seats backs will not pivot forwardly, projecting the front-seat passengers forwardly also.

Thus such a hinge normally comprises an upper hinge element secured to the back part of the motor-vehicle seat and a lower hinge element fixed to the seat part. A pivot is provided between these parts. One of the parts also normally carries a pivotal positioning plate that can be pivoted about the pivot between the two parts and which can be positioned in any of a plurality of angularly offset positions and fixed in this position relative to one of the hinge elements. This positioning plate constitutes an abutment engageable with the other of the hinge elements and serving to define the rest position of the back part relative to the seat part. A toothed portion of the positioning plate to this end is normally engageable with a toothed pawl that can be displaced radially into and out of mesh with the teeth of the positioning plate and fix it in any of the angularly offset positions.

Furthermore the positioning plate normally has a stop formation which is directed toward and engageable with a pivotal pawl provided on the other hinge element. This pawl has an end face flatly engageable with the stop formation so as normally to prevent forward pivoting of the back part relative to the seat part. An operating button or lever is provided on the back part which when actuated pulls the end face out of alignment with the stop formation and allows the back part to pivot forwardly.

Thus in order to enter or gain access to the rear side of the motor vehicle, it is necessary to simultaneously actuate the release button and displace the back part forwardly. Usually this operation requires two hands.

Not only is such an operation cumbersome, but the extra mechanism for operation of the release lever or element considerably increases the cost of the hinge assemblies for the motor-vehicle seats.

SUMMARY OF THE INVENTION

It is therefore an object of the present invention to provide an improved hinge for interconnecting the back part and the seat part of a motor-vehicle seat.

Yet another object is to provide such a hinge which allows substantially easier forward pivoting of the back part, yet which is relatively simple in construction and which can be produced at low cost.

These objects are attained according to the present invention in a hinge having an upper hinge element and a lower hinge element interconnected by a pivot means which define for the hinge elements a rest position so that the upper hinge element, which may be connected to the back part of a motor-vehicle seat, can pivot forwardly relative to the lower hinge part, which may be connected to the seat part of the motor-vehicle seat, from the rest position, and for pivoting of the upper part backwardly into but not beyond the rest position relative to the lower part. Stop means is connected to these elements and is displaceable between a blocking position in which it prevents forward pivoting of the upper hinge part forwardly out of the rest position and a freeing position wherein it permits such forward pivoting. According to this invention inertial means is connected to the stop means and serve to displace same from the blocking position into the freeing position only on slow forward pivoting of the back part. Attempted rapid forward pivoting of the back part is not effective via the inertial release means on the stop means so that the stop means remains in the blocking position.

Thus in accordance with the present invention no extra actuator is necessary for the means that prevent the back part of the seat from pivoting forwardly relative to the seat part. In order to pivot the seat forward the person wishing to enter or gain access to the back seat need merely slowly pivot the back part of the front seat forwardly. In the case of an accident or sudden stop, however, the inertial release mechanism will lock the seat back relative to the seat part and prevent such forward pivoting.

More particularly, in accordance with this invention the hinge has an inertial release pawl which is pivoted on one of the hinge elements about a pawl axis and which is weighted so as normally to pivot in one rotational sense from a predetermined blocking position. The stop means includes a stop formation normally fixed on the other of the hinge elements and engageable with a stop face of the pawl only in the blocking position of the pawl for preventing forward pivoting of the upper hinge part as described above. The stop face and the stop formation are out of alignment and unengageable with each other when the pawl is out of the blocking position for free forward pivoting of the upper hinge element. The inertial release means further includes a support surface which is normally fixed on the other hinge element and another surface on the pawl engageable with this support surface for supporting the pawl in the blocking position when the upper hinge element is in the rest position and for releasing the pawl and simultaneously allowing same to pivot in the one rotational sense out of its blocking position only in response to slow forward displacement of the upper hinge element.

More particularly, the one hinge element is the upper hinge element and is displaceable itself in the rest position between a rear rest position and a forward rest position. The stop formation and the stop face are spaced apart in the rear rest position but abut in the front rest position. Similarly, the support surface engages the other surface and supports the pawl in the rear rest position and is out of effective engagement with the other surface in the front rest position.

According to yet another feature of this invention the pawl is formed as a two-arm lever pivotal about a respective pawl axis parallel to, in front of, and above the pivot axis between the two hinge elements. This pawl has one downwardly projecting arm whose end is constituted as the stop face, and another generally horizontally extending arm formed with a downwardly open cutout having a side constituting the other surface engageable with the support surface of the hinge. A weight is provided on this horizontally and backwardly extending arm. Extra weights may be connected to this arm for increasing the reaction speed of the pawl, that is, making it possible to move the seat back forwardly at a greater rate without blocking the device. A plurality of holes may be provided in this backwardly extending arm for mounting the weight of weights in various positions, or a horizontally extending slot may be provided for adjustment of the position of the weight.

The hinge is provided according to this invention with a pivot plate pivotal about the axis between the two hinge elements and fixable by means of a toothed pawl in any of a plurality of angularly offset positions about this axis. This positioning plate has a generally forwardly and upwardly open recess whose bottom and front sides constitutes the stop formation and whose upper and forwardly open side constitutes an abutment in which may fit a formation or pin carried on the upper hinge element. This abutment defines the rest position of the device. The uppermost portion of this recess also constitutes the support surface which extends at an angle to a radius drawn from the pivot axis between the two hinge elements. Thus the exacet angular position of the seat back in its rest position has virtually no effect on the abovedescribed inertial operation of the release mechanism.

According to yet another feature of this invention the stop face of the release pawl lies substantially perpendicular to a radius drawn from the pawl axis. The stop formwation has a face engageable with the stop face which itself lies on a radius of the pivot axis. The pawl axis is positioned with respect to the pivot axis at such a distance that the stop face and the face of the stop formation meet flatly with excellent force transmission between them. Thus the release pawl can withstand very large forces pushing the seat forwardly. In this manner even if the vehicle is involved in a frontal collision, a rear seat passenger or package propelled at high speed against the back of the front seat will not be able to pivot the back part of the front seat forwardly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view illustrating the hinge according to the present invention;

FIGS. 4 and 5 are sections taken along lines IV—IV and V—V of FIGS. 2 and 3, respectively; and FIGS. 6 and 7 are side detail views of alternative arrangements according to the present invention.

SPECIFIC DESCRIPTION OF PREFERRED EMBODIMENTS

Figure 2:
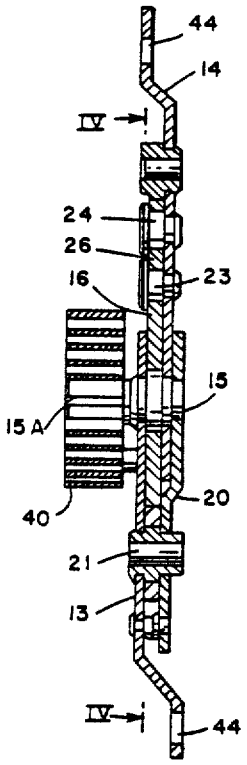
FIG. 2 is a section through the hinge according to this invention.
Figure 3:
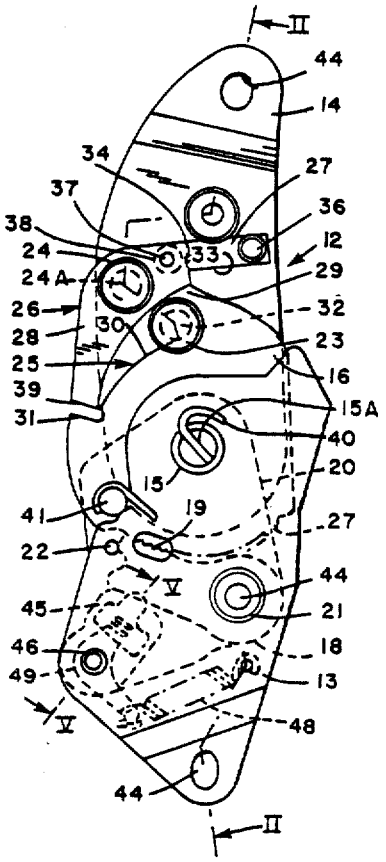
FIG. 3 is a side view of the hinge of FIG. 2, line II—II of FIG. 3 being the section line for FIG. 2.

As shown in FIG. 1 a motor-vehicle seat according to this invention has a seat part 10 and a back part 11 interconnected via a hinge 12 for pivoting about an axis 15A (FIGS. 3 and 3). The seat 10, 11 is adapted to be the front seat of an automobile vehicle and may carry two such hinges 12 or only one such hinge 12 with the other side of the seat being connected via a simple pivot.

As shown in FIGS. 2–5 the hinge according to this invention basically comprises a lower hinge element or plate 13 normally fixed to the seat part 10 and an upper hinge element or plate 14 normally fixed to the seat back 11. The two elements 13 and 14 are interconnected at a tubular pivot pin 15 which is fixed in the element 13. Mounting holes 44 in the elements 13 and 14 are provided for securing these elements to the respective parts 10 and 11.

A fork plate 20 is spaced axially by spacers 21 and secured by rivets 22 to the element 13. This plate 20 and the plate 13 sandwich a flat positioning plate 16 pivotal about the axis or pivot 15 and provided on its arcuate lower edge with teeth 17. The spacer 21 pivotally carries a locking pawl 18 having teeth 19 meshable with the teeth 17. In addition, a pin 46 journalled in the plate 13 has one end 47 which is milled and adapted to receive an adjustment knob or release lever and another end which carries a further lever or pawl 45 which is urged by means of a spring 48 connected to it through a two-armed lever 49 against the back of the pawl 18. Thus clockwise rotation of the pivot pin 46 as seen in FIG. 3 will pull the end of the lever 45 out of engagement with the back of the pawl 18 and allow the teeth 19 to come out of mesh from the teeth 17. A spring 40 has one end fixed to the axis tube 15 and another end secured over a pin 41 on the plate 16 so that when the teeth 17 and 19 are out of mesh this spring 40 will pivot the plate 16 forwardly or counterclockwise as seen in FIG. 3.

The plate 16 is formed with a recess or notch 25 having a root or bottom surface 30 formed as a circular arc having a center of curvature at the axis 15A. The recess 25 is radially outwardly open and has a generally upward directed radially extending side constituting an abutment face or formation 31. The opposite end of the recess 25 has an arcuate portion 32 adapted to receive an axially projecting pin 23 fixed to the upper hinge element 14. Thus this portion 32 constitutes an abutment limiting counterclockwise or backward pivoting of the element 14 about axis 15A. Above the portion 32 the rear side of the recess 25 is formed as a straight support surface 29 extending generally at an angle of 45° forwardly and downwardly across a vertical radius from the axis 15A.

Figure 4:
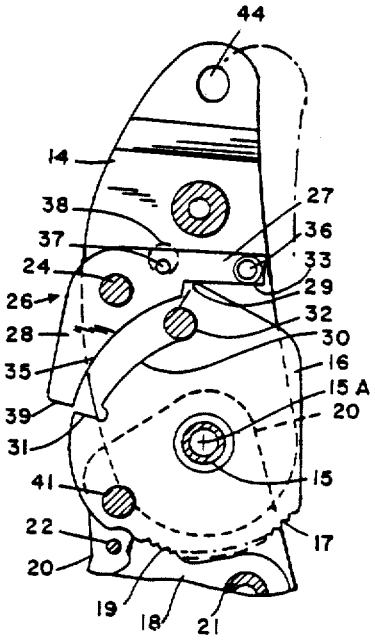

A release pawl constituted as a two-arm lever 26 is pivoted on a pin 24 on the upper hinge element 14 for pivoting of the pawl 26 about an axis 24a spaced upwardly and in front of the axis 15A. This pawl 26 has a downwardly extending relatively light arm 28 whose end 39 is flatly engageable with the face 31 but which in the rest position of the hinge elements 13 and 14 spaced between 1° and 5°, here 3°, from the surface 31. The pawl 26 also has a rearwardly extending relatively heavy arm 27 carrying at its outer end a weight 36 formed with a backwardly open cutout 33 having a forward backwardly directed surface or straight edge 34 which in the rest position shown in FIG. 3 lies above the support surface 29 but which can slide down along the support surface 29 as shown in FIG. 4. Finally, the upper arm 27 of the pawl 26 is provided with a laterally extending projection 37 engaging through a relatively large-diameter hole 38 in the upper element 14. These formations 37 and 38 limit the pivoting motion of the pawl 26 to a relatively small angular extent. The pawl 26 has an arcuate surface 35 which has a center of curvature which lies on the axis 15A in the freeing position of this pawl 26 shown in FIG. 4.

As shown in FIG. 6 the upper arm 27 may be formed with four holes 42 in which screw-type weights 36′ may be mounted. Furthermore, several such weights 36′ may be mounted on the arm 27, one in each hole 42. It is also possible as shown in FIG. 7 to provide a relatively long slot 43 in the arm 27 so that a weight 36″ constituted as a screw and nut may be moved horizontally along this arm 27.

In the normal position of the hinge 12 according to this invention the parts are in the position shown in FIG. 3. Here the faces 31 and 39 are spaced apart by an angular distance of 3° but directly aligned with each other. The corner or surface 34 is supported by the surface 29 so as to hold the pawl 26 in the raised blocking position, with the elements 13 and 14 positioned relative to each other in a rear rest position with the pin 23 snugly received in the abutment portion 32.

If the seat back 11 is displaced slowly forwardly from this position in FIG. 3 the surface 34 will slide slowly down the surface 29 so that the entire pawl 26 will pivot clockwise into the position shown in FIG. 4. The overlap of the surface 29 and 34 is less than 3° so that it is possible to slowly move the upper hinge element 14 forwardly with the surface 34 riding down on the surface 29 until the pawl 26 moves completely from the blocking position of FIG. 3 to the clearing position of FIG. 4. Approximately 2.5° of angular displacement of the element 14 relative to the element 13 about the axis 15A is necessary to move the pawl 26 from the blocking to the freeing position. Subsequent forward pivoting of the element 14, even if very rapid, will not be hindered because the face 39 will have angularly passed the face 31 and the inner surface 35 will ride on the outer surface of the plate 16 below the face 31.

If the seat back 11 is, however, abruptly pushed forward or an attempt is made to sharply or rapidly push it forward the inertial release pawl 26 will not have time to ride down on the surface 29 to move completely from the blocking to the freeing position before the face 39 comes into flat abutment with the face 31. Such mutual abutment will immediately stop further forward displacement of the seat back 11. Thus, if moved abruptly the seat back 11 can only move through 3° relative to the seat part 10. Such angular motion is relatively slight and poses absolutely no hazard to a front-seat passenger.

Thus with the system according to the present invention it is possible to pivot the set back 11 forwardly in the relatively easy manner of a seat back that is not provided with the latching mechanism. At the same time, however, the seat back 11 will not move forward in case of an accident or the like, so that the hinge 12 has all the advantages of the prior art unsafe hinges and the advantages of the more modern latch-type safety hinges.

From the foregoing description it will be understood that the inertial pawl 26 is subject to gravity and inertial forces on weight 36. The resultant force that gravity and any vehicle deceleration imparts to such weight, together with a reaction force at the pivot pin 24, create a force couple tending to rotate the pawl 26 whenever such resultant is in a direction passing said pin 24 at some distance which constitutes an effective force couple arm.

When the vehicle is stationary, gravity acting on weight 36, provides a force couple tending to release pawl 26 from its normal blocking position when the seat back moves forward. In order to effect such release, inertia resisting rotation of pawl 26 to a release position must be sufficiently overcome by the combination of such gravity and inertial force couples to reach a release clearance position, as illustrated in FIG. 4, within the time the seat back moves forward 3°.

However, when the vehicle is moving, sudden deceleration imparted through the seat back to pivot pin 24, together with forward inertia of weight 36, create a force couple, increasing with rate of deceleration, which tends to hold pawl 26 in its 2 blocking position. When the effective resultant direction of gravity and forward inertial forces reaches or overpasses pivot pin 24, there is no resultant force couple tending to release pawl 26 so that any rapid seat back movement is arrested by the blocking action of pawl 26, and the inertia resisting rotation of pawl 26 assists in retaining the pawl in its blocking position.

Thus, pawl 26 will move from its normal blocking position to a freeing position only when the resultant force of gravity and any inertial force together with pivot reaction provide an effective unblocking couple during initial forward seat back movement.

It will be understood that each of the elements described above, or two or more together, may also find a useful application in other types of mechanism differing from the types described above.

While the invention has been illustrated and described as embodied in a motor-vehicle seat hinge, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be secured by Letters Patent is set forth in the appended claims:

1. In a motor-vehicle seat having a seat part and a reclining back part adjustable in any of a plurality of angular positions relative to said seat part, a hinge comprising:

a lower hinge element fixed to said seat part;

an upper hinge element fixed to said back part;

means for pivotably connecting said upper hinge element to said lower hinge element;

a positioning element pivotal on said lower hinge element and formed with an outwardly open recess having one end forming a stop formation and another end forming an abutment engaging said upper hinge element in a rest position thereof;

an inertial pawl in the form of a two-arm lever pivotal on said upper hinge between a blocking position and a freeing position, one arm of said lever being directed toward said stop formation on said positioning element and having a stop face engageable with said formation when said pawl is in said blocking position, the other arm of said lever being directed substantially horizontally and weighted so as normally to pivot by gravity in one rotational sense into said freeing position;

said another end on said positioning element having a support surface adapted for engaging said other arm against the force of gravity to urge said pawl into said blocking position and for releasing said other arm into said freeing position only [[upon a slow forward pivoting of said back part]] when the resultant of gravity and any inertial force, together with pivot reaction provide an effective unblocking couple on the inertial pawl during initial forward seat back movement; and means for locking and positioning means in any of a plurality of angularly offset positions for adjusting said rest position.

2. The hinge defined in claim 1 wherein said upper hinge element is displaceable in said rest position between a rear rest position and a front rest position, said step formation and stop face being spaced apart in said rear rest position and abutting in said front rest position, said support surface engaging said other surface and supporting said other arm of said pawl in said rear rest position and being out of effective engagement with said other surface in said front rest position.

3. The hinge defined in claim 2 further comprising means including interengaging formations on said release pawl and said upper hinge element for limiting pivoting of said release pawl in said one rotational sense from said blocking position into a freeing position just clearing said stop formation with said stop face.

4. A hinge defined in claim 2 wherein said support surface is above said stop formation and extends at an angle to a radius of the pivot axis of said hinge elements relative to each other.

5. The hinge defined in claim 2 wherein said stop formation and said stop face abut flatly in said forward rest position.

6. The hinge defined in claim 1 wherein said means for locking includes a locking pawl having at least one tooth radially engageable with said positioning means relative to the pivot axis thereof.

7. The hinge defined in claim 1 wherein said other arm is formed with a cutout in part defined by said other surface.

8. The hinge defined in claim 1 wherein said other arm is provided with an adjustable weight.

9. The hinge defined in claim 7 wherein said other arm is generally radial of said pawl axis and formed with a plurality of holes in a row extending generally radially of said pawl axis, said weight being securable in any of said holes.

10. The hinge defined in claim 8 wherein said other arm is formed with an elongated slot extending generally radially of said pawl axis, said weight being securable anywhere along said slot.

*11. In a motor-vehicle having a seat part and a reclining back part adjustable in any of a plurality of angular positions relative to said seat part, a hinge comprising:*

*a lower hinge element fixed to said seat part;*

*an upper hinge element fixed to said back part;*

*means for pivotably connecting said upper hinge element to said lower hinge element;*

*a positioning element pivotal on said lower hinge element and formed with a stop formation and an abutment engaging said upper hinge element in a rest position thereof;*

*an inertial pawl in the form of a two-arm lever pivotal on said upper hinge between a blocking position and a freeing position, one arm of said lever being directed toward said stop formation on said positioning element and having a stop face engageable with said formation when said pawl is in said blocking position, the other arm of said lever being weighted so as normally to pivot by gravity in one rotational sense into said freeing position; said positioning element having a support surface adapted for engaging said other arm against the force of gravity to urge said pawl into said blocking position and for releasing said other arm into said freeing position only [[upon a slow forward pivoting of said back part]]* when the resultant force of gravity and any inertial force together with pivot reaction provide an effective unblocking couple on the inertial pawl during initial forward seat back movement; *and*

*means for locking said positioning means in any of a plurality of angularly offset positions for adjusting said rest position.*

*12. The hinge defined in claim 11 wherein said upper hinge element is displaceable in said rest position between a rear rest position and a front rest position, said stop formation and stop face being spaced apart in said rear rest position and abutting in said front rest position, said support surface engaging said other surface and supporting said other arm of said pawl in said rear rest position and being out of effective engagement with said other surface in said front rest position.*

*13. The hinge defined in claim 12, further comprising means including interengaging formations on said release pawl and said upper hinge element for limiting pivoting of said release pawl in said one rotational sense from said blocking position into a freeing position just clearing said stop formation with said stop face.*

*14. A hinge defined in claim 12 wherein said support surface is above said stop formation and extends at an angle to a radius of the pivot axis of said hinge elements relative to each other.*

*15. The hinge defined in claim 12 wherein said stop formation and said stop face abut flatly in said forward rest position.*

*16. The hinge defined in claim 11 wherein said means for locking includes a locking pawl having at least one tooth radially engageable with said positioning means relative to the pivot axis thereof.*

*17. The hinge defined in claim 11 wherein said other arm is formed with a cutout in part defined by said other surface.*

*18. The hinge defined in claim 12 wherein said other arm is provided with an adjustable weight.*

*19. The hinge defined in claim 17 wherein said other arm is generally radial of said pawl axis and formed with a plurality of holes in a row extending generally radially of said pawl axis, said weight being securable in any of said holes.*

*20. The hinge defined in claim 18 wherein said other arm is formed with an elongated slot extending generally radially of said pawl axis, said weight being securable anywhere along said slot.*

* * * * *